US009953630B1

(12) United States Patent
Aubrey et al.

(10) Patent No.: US 9,953,630 B1
(45) Date of Patent: Apr. 24, 2018

(54) LANGUAGE RECOGNITION FOR DEVICE SETTINGS

(71) Applicant: Amazon Technologies, Inc., Reno, NV (US)

(72) Inventors: Colleen Maree Aubrey, Seattle, WA (US); Jeffrey Penrod Adams, Tyngsborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 254 days.

(21) Appl. No.: 13/907,178

(22) Filed: May 31, 2013

(51) Int. Cl.
| | |
|---|---|
| *G06F 17/20* | (2006.01) |
| *G06F 17/28* | (2006.01) |
| *G06F 17/27* | (2006.01) |
| *G06F 3/00* | (2006.01) |
| *G06F 3/048* | (2013.01) |
| *G06F 15/173* | (2006.01) |
| *G06F 15/16* | (2006.01) |
| *G10L 21/00* | (2013.01) |
| *G10L 25/00* | (2013.01) |
| *G10L 15/00* | (2013.01) |
| *G10L 15/26* | (2006.01) |
| *G10L 15/18* | (2013.01) |
| *G10L 15/04* | (2013.01) |
| *G10L 17/00* | (2013.01) |
| *G10L 15/16* | (2006.01) |
| *G10L 19/00* | (2013.01) |
| *H04N 7/00* | (2011.01) |
| *H04N 7/14* | (2006.01) |
| *G09G 5/00* | (2006.01) |

(52) U.S. Cl.
CPC ................................ *G10L 15/005* (2013.01)

(58) Field of Classification Search
CPC .............. G06F 17/289; G06F 17/2872; G06F 17/2785; G06F 17/2735; G06F 9/4448; G11C 2207/16; G10L 15/265; G10L 15/16; G10L 15/20; G10L 15/063; G10L 15/30; G10L 15/22; G10L 17/005; G10L 17/26
USPC ..... 704/2–10, 205, 233, 235, 245, 246, 270, 704/274, 270.1, 251, 257, 277, 201
See application file for complete search history.

(56) References Cited

U.S. PATENT DOCUMENTS

| | | | | |
|---|---|---|---|---|
| 5,440,615 | A * | 8/1995 | Caccuro | H04M 3/533 379/207.01 |
| 5,526,268 | A * | 6/1996 | Tkacs et al. | 704/8 |
| 5,758,023 | A * | 5/1998 | Bordeaux | 704/232 |
| 6,069,939 | A * | 5/2000 | Fung et al. | 379/67.1 |
| 6,424,935 | B1 * | 7/2002 | Taylor | 704/10 |
| H0002098 | H * | 3/2004 | Morin | 704/2 |
| 6,785,654 | B2 * | 8/2004 | Cyr | G10L 15/30 704/257 |
| 6,963,836 | B2 * | 11/2005 | Van Gestel | G06F 3/16 704/321 |
| 7,133,830 | B1 * | 11/2006 | Hoban et al. | 704/270.1 |

(Continued)

*Primary Examiner* — Anne Thomas-Homescu
(74) *Attorney, Agent, or Firm* — Pierce Atwood LLP (57) ABSTRACT

A computing device reduces the complexity of setting a preferred language on the computing device based on verbal communications with a user. The device may detect when a user is having difficulty navigating a device in a current language and detects the language spoken by a user to cause a language setting to change. The computing device may cross reference other information associated with user, such as other applications or content, when selecting a preferred language.

21 Claims, 6 Drawing Sheets

(56) References Cited

U.S. PATENT DOCUMENTS

| | | | |
|---|---|---|---|
| 7,185,289 B1* | 2/2007 | Taima | 715/810 |
| 7,277,732 B2* | 10/2007 | Chen et al. | 455/566 |
| 7,286,990 B1* | 10/2007 | Edmonds et al. | 704/275 |
| 7,340,390 B2* | 3/2008 | Hurst | G06F 17/2735 455/412.1 |
| 7,343,290 B2* | 3/2008 | Breuer | H04M 3/493 704/2 |
| 7,447,635 B1* | 11/2008 | Konopka | G10L 15/22 704/231 |
| 7,475,390 B2* | 1/2009 | Berstis et al. | 717/136 |
| 7,822,434 B2* | 10/2010 | Scott | G06F 17/289 455/414.1 |
| 7,835,901 B2* | 11/2010 | Muramatsu et al. | 704/8 |
| 7,843,330 B2* | 11/2010 | Chamberlain et al. | 340/539.12 |
| 7,850,640 B2* | 12/2010 | Williams et al. | 604/65 |
| 7,852,416 B2* | 12/2010 | Bennett et al. | 348/734 |
| 7,949,517 B2* | 5/2011 | Eckert et al. | 704/8 |
| 7,953,879 B1* | 5/2011 | Nagaralu | G06F 17/3012 707/609 |
| 7,979,442 B2* | 7/2011 | Hyman | G06F 17/30035 707/741 |
| 8,005,680 B2* | 8/2011 | Kommer | G06Q 30/02 379/88.01 |
| 8,041,372 B1* | 10/2011 | Minns | G06F 17/3087 455/414.3 |
| 8,065,134 B2* | 11/2011 | Naito | G06F 9/4448 704/257 |
| 8,069,030 B2* | 11/2011 | Iso-Sipila | G06F 9/4448 379/67.1 |
| 8,099,289 B2* | 1/2012 | Mozer et al. | 704/275 |
| 8,099,290 B2* | 1/2012 | Suzuki et al. | 704/277 |
| 8,126,703 B2* | 2/2012 | Runge et al. | 704/8 |
| 8,161,073 B2* | 4/2012 | Connor | G06F 17/3064 707/791 |
| 8,170,868 B2* | 5/2012 | Gamon | G06F 17/27 704/1 |
| 8,229,743 B2* | 7/2012 | Carter et al. | 704/251 |
| 8,234,111 B2* | 7/2012 | Lloyd et al. | 704/233 |
| 8,238,525 B2* | 8/2012 | Zhang et al. | 379/88.01 |
| 8,279,861 B2* | 10/2012 | Chao-Suren et al. | 370/356 |
| 8,285,537 B2* | 10/2012 | Tanner et al. | 704/4 |
| 8,290,701 B2* | 10/2012 | Mason et al. | 701/422 |
| 8,359,234 B2* | 1/2013 | Vieri | 705/14.49 |
| 8,364,134 B2* | 1/2013 | Rang | G06F 17/276 455/418 |
| 8,380,505 B2* | 2/2013 | Konig | G06F 17/30392 379/88.02 |
| 8,446,901 B2* | 5/2013 | Merino Gonzalez et al. | 370/356 |
| 8,479,112 B2* | 7/2013 | Clow | G06F 3/04886 345/171 |
| 8,498,725 B2* | 7/2013 | Petit-Huguenin | 700/94 |
| 8,510,103 B2* | 8/2013 | Angott | 704/205 |
| 8,515,728 B2* | 8/2013 | Boyd | G06F 17/28 704/2 |
| 8,515,762 B2* | 8/2013 | Krumel | G10L 15/32 345/530 |
| 8,560,326 B2* | 10/2013 | Gao | G10L 13/00 704/200 |
| 8,612,224 B2* | 12/2013 | Breslin et al. | 704/245 |
| 8,635,058 B2* | 1/2014 | Patel | 704/2 |
| 8,635,068 B2* | 1/2014 | Pulz et al. | 704/257 |
| 8,666,014 B2* | 3/2014 | Suzuki | G10L 19/008 360/39 |
| 8,666,750 B2* | 3/2014 | Buck et al. | 704/275 |
| 8,677,463 B2* | 3/2014 | Piepenbrink et al. | 726/6 |
| 8,793,118 B2* | 7/2014 | Srinivasa | G09B 21/009 704/2 |
| 8,813,059 B2* | 8/2014 | Sasaki | 717/168 |
| 8,837,687 B2* | 9/2014 | Odinak et al. | 379/88.01 |
| 8,874,429 B1* | 10/2014 | Crosley | G06F 17/289 348/14.08 |
| 8,879,701 B2* | 11/2014 | Phadnis et al. | 379/142.04 |
| 8,880,631 B2* | 11/2014 | Logan | H04L 67/02 709/206 |
| 8,886,453 B2* | 11/2014 | Cerecke et al. | 701/422 |
| 8,909,532 B2* | 12/2014 | Cross, Jr. | 704/270.1 |
| 8,913,193 B2* | 12/2014 | Fukunaka | 348/569 |
| 8,924,215 B2* | 12/2014 | Pulz et al. | 704/257 |
| 8,924,853 B2* | 12/2014 | Weng et al. | 715/716 |
| 8,929,853 B2* | 1/2015 | Butler | H04M 1/72538 379/39 |
| 8,942,974 B1* | 1/2015 | Leblang | 704/8 |
| 8,972,268 B2* | 3/2015 | Waibel | G10L 15/265 704/2 |
| 8,972,967 B2* | 3/2015 | Sannidhanam | G06F 8/60 717/170 |
| 8,976,944 B2* | 3/2015 | Doulton | 379/88.14 |
| 8,977,974 B2* | 3/2015 | Kraut | H04N 5/60 320/129 |
| 8,983,038 B1* | 3/2015 | Boutcher et al. | 379/88.01 |
| 9,002,699 B2* | 4/2015 | Qin | G06F 3/01 704/2 |
| 9,020,760 B2* | 4/2015 | Fryer et al. | 701/533 |
| 9,020,824 B1* | 4/2015 | Govil | G10L 19/04 704/270 |
| 9,021,245 B2* | 4/2015 | Guidotti | G06F 9/5072 709/226 |
| 9,031,293 B2* | 5/2015 | Kalinli-Akbacak | 382/128 |
| 9,031,839 B2* | 5/2015 | Thorsen et al. | 704/235 |
| 9,043,205 B2* | 5/2015 | Mengibar et al. | 704/235 |
| 9,094,702 B2* | 7/2015 | Bhogal | H04N 21/25883 |
| 9,098,197 B2* | 8/2015 | Suese | G06F 3/04886 |
| 9,129,591 B2* | 9/2015 | Sung | G10L 15/32 |
| 9,138,591 B2* | 9/2015 | Abbenhouse | G09B 23/288 |
| 9,160,967 B2* | 10/2015 | Wang | G06F 17/289 |
| 9,165,071 B2* | 10/2015 | Myslinski | G06Q 10/10 |
| 9,177,545 B2* | 11/2015 | Maruta | G10L 13/08 |
| 9,251,144 B2* | 2/2016 | Du | G06F 3/0488 |
| 9,275,635 B1* | 3/2016 | Beaufays | G10L 15/32 |
| 9,368,104 B2* | 6/2016 | Eller | G10L 13/08 |
| 9,414,004 B2* | 8/2016 | Tran | G10L 15/22 |
| 9,471,567 B2* | 10/2016 | Duyaguit | G06F 17/275 |
| 9,483,461 B2* | 11/2016 | Fleizach | G10L 13/033 |
| 9,489,375 B2* | 11/2016 | Koll | G06F 17/276 |
| 9,502,025 B2* | 11/2016 | Kennewick | G06Q 30/0601 |
| 9,697,822 B1* | 7/2017 | Naik | G10L 15/063 |
| 9,747,510 B2* | 8/2017 | Jordan | G06K 9/3208 |
| 9,754,589 B2* | 9/2017 | Mathias | G10L 15/22 |
| 2002/0186328 A1* | 12/2002 | Nishida | H04N 5/607 348/738 |
| 2010/0223050 A1* | 9/2010 | Kelly | G06Q 30/02 704/8 |
| 2011/0153325 A1* | 6/2011 | Ballinger et al. | 704/235 |
| 2012/0010886 A1* | 1/2012 | Razavilar | 704/246 |

* cited by examiner

LANGUAGE RECOGNITION FOR DEVICE SETTINGS

BACKGROUND

The use of wireless devices is widespread and growing. Many wireless devices are capable of operating in multiple languages. The language setting may be changed by following traditional device menu commands. After a language setting is changed, all further operation by the device is typically in the newly selected language until and unless the language is once again changed by the user.

BRIEF DESCRIPTION OF DRAWINGS

For a more complete understanding of the present disclosure, reference is now made to the following description taken in conjunction with the accompanying drawings.

DETAILED DESCRIPTION

Setting a language on an computing device can be challenging, especially for users who are not familiar with computing devices. Further, returning the computing device to a preferred language setting may become even more challenging when the language setting of the computing device is changed, which may happen either accidentally or intentionally, such as by an earlier user who preferred the device operate in a different language from that preferred by a later user. If a language of a device is somehow set to a language that a user does not understand, the use may experience frustration with the device and be unable to reset the language without difficulty. A number of implementations exist to navigate computing devices to reset a preferred language, however those implementations all involve following standard menu device commands that may be in a language a user does not understand.

Even communications to traditional customer services agents are unlikely to solve the problem as such agents may have limited ability to remotely operate the device or assist the user, particularly if the device is operating in a language the user does not understand, rendering the user incapable of precisely describing the device operation to a remote agent. As the customer service agent is unable see the computing device, he/she may be limited to virtually describing a solution to the user for setting the computing device to the user's preferred language.

Offered is a method for setting a preferred language on a computing device based on communications from a user in a preferred language. The device may include speech recognition capability that may recognize when a user is speaking a language different from a currently indicated language in a device setting. The communication may be, for example, repeated speech from a user in a language recognized to be a different from a currently selected language of the device. Such speech may indicate frustration with the device operation. The communications from the user may be received by the computing device directly from the user or may be received by a remote device (such as a server) configured to process communications from the user. In one aspect the language setting method cross references other information associated with the user or the computing device to determine and/or confirm the preferred language. The cross referenced information may be other configurations, settings, and/or information associated with the computing device.

Figure 1:
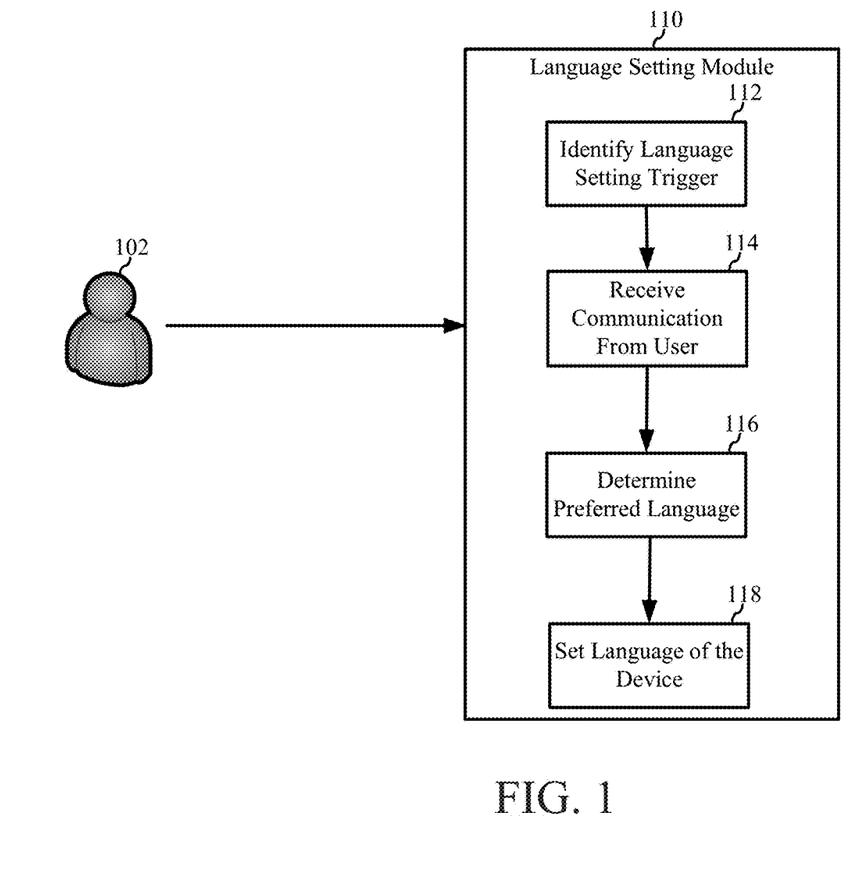
FIG. 1 illustrates a pictorial diagram of a method and system for setting a preferred language on an electronic/computing device according to one aspect of the present disclosure.

FIG. 1 illustrates an example preferred language setting implementation on a device according to one aspect of the present disclosure. The computing device 104 may monitor input to the computing device to identify a language uncertainty trigger or indication, which initiates the preferred language setting implementation. The monitoring may include listening to speech from the user 102 or navigation of the device 104 by the user 102. The preferred language setting implementation may be performed in the language setting module 110 in the computing device.

At block 112, the language setting module 110 may receive a communication of the user 102. The communication may be in the form of speech, device navigation, or other communication. The language setting module 110 will then identify a language uncertainty trigger at block 112. The language uncertainty trigger may be some indication that the user 102 is struggling to navigate a feature, e.g., language setting, of the computing device or is generally struggling to operate the device 104. Such struggles may be evidenced by randomly operating the device 104.

At block 116, the language setting module may determine a preferred language of the user based on the communication of the user. At block 118, the language setting module 110 may select the preferred language of the computing device based on the communication of the user 102. Determining and/or Setting the preferred language may be implemented in conjunction with a speech recognition technique which recognizes the language spoken by the user. In one aspect, upon identification of the language uncertainty trigger in block 114 the user may be prompted by the device 104 to further communicate with the device in the user's preferred language so the language setting module 110 may confirm the preferred language. In some aspects, the preferred language may be set based on the user communication in conjunction with other information associated with the device 104 and/or the user 102, such as settings, configurations, and/or content which may indicate a language preference.

Figure 2:
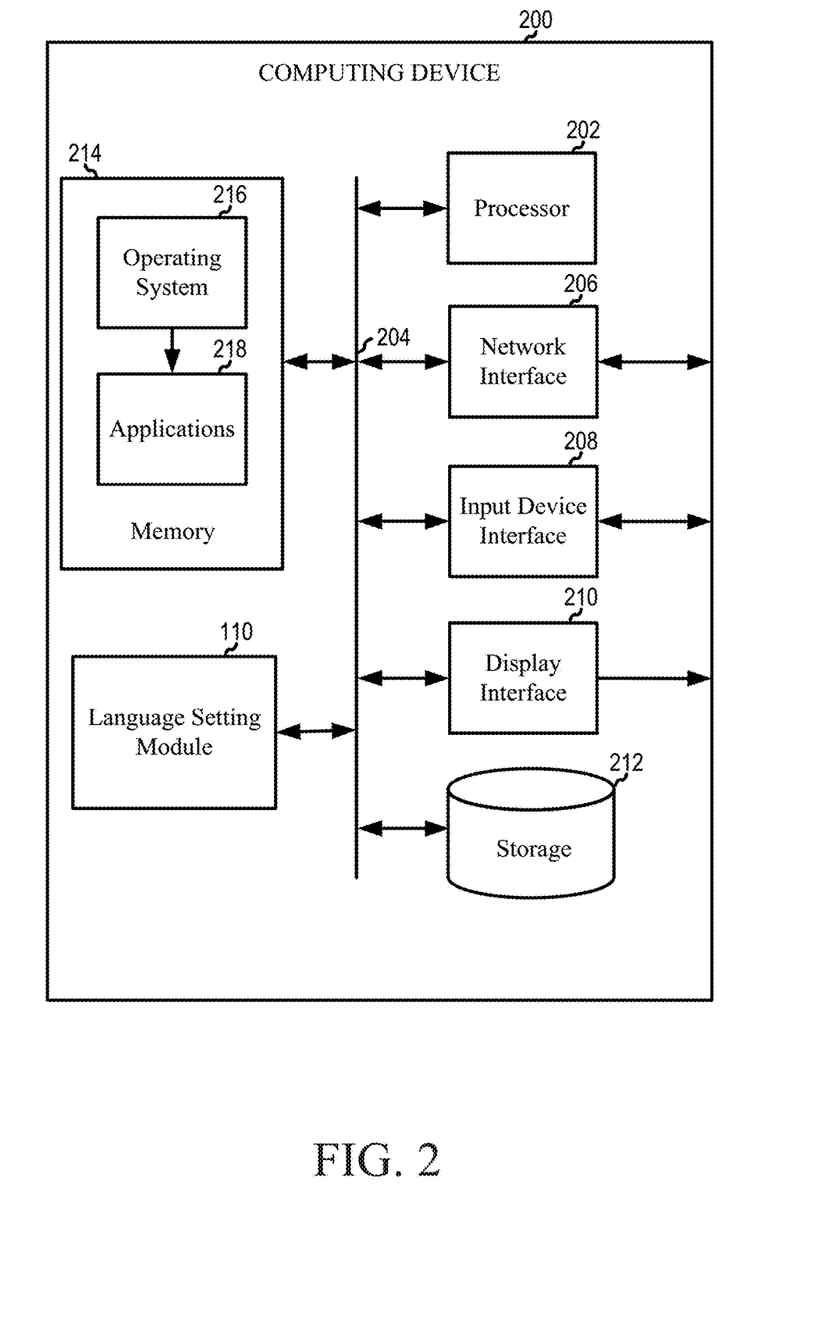
FIG. 2 is a block diagram conceptually illustrating a computing device according to one aspect of the present disclosure.

Aspects of the present disclosure may be implemented as a computer implemented method in a computing device or computer system. FIG. 2 illustrates an exemplary computing device 200. The computing device 200 may include a processor 202 in communication with a variety of other components over a system bus 204 or through a direct connection. These other components may include, for example, a network interface 206, an input device interface 208, a display interface 210, a storage database 212, and a language setting module 110. As appreciated by those skilled in the art, the network interface 206 enables the computing device 200 to communicate data, control signals, data requests, and other information (e.g., speech or representations of speech) with other resources including computers, data sources, storage devices, and the like, on a computer network such as the Internet. The network interface 206 may be configured to communicate via wired or wireless connections. As one skilled in the art should appreciate, the computing device 200 may obtain an electronic textual work/speech from another computer, a storage device, or other source via the computer network, as well as save the textual work/speech to a networked location or send it to another computer on the network.

The input device interface 208, sometimes also embodied as an input/output interface, enables the computing device 200 to obtain data input/speech from a user 102 and/or a variety of devices including, but not limited to, a digital pen, a touch screen, a keyboard, a mouse, a scanner, and the like. In addition to the exemplary components described above, a display interface 210 may be used for outputting display information to a computer user. Typically, the display information is output by the display interface 210 via a display device (e.g., a monitor or similar device). While not illustrated, one skilled in the art should appreciate that a display device may be incorporated as an integral element within a computing device 200 or may be separate therefrom.

The processor 202 may be configured to operate in accordance with programming instructions stored in a memory 214. The memory 214 generally comprises RAM, ROM, and/or other memory. Thus, in addition to storage in read/write memory (RAM), programming instructions may also be embodied in read-only format, such as those found in ROM or other non-volatile memory. The memory 214 may store an operating system 216 for controlling the operation of the computing device 200. The operating system may be a general purpose operating system such as a Microsoft Windows operating system, a UNIX operating system, a Linux operating system, or an operating system specifically written for and tailored to the computing device 200. Similarly, the memory 214 may also store user-executable applications 218, or programs, for conducting various functions on the computing device 200. For example, the application 218 in memory 214 may be configured according to aspects of the present disclosure to process or analyze communications (voice and data), settings and configurations stored in the storage database 212.

Figure 3:
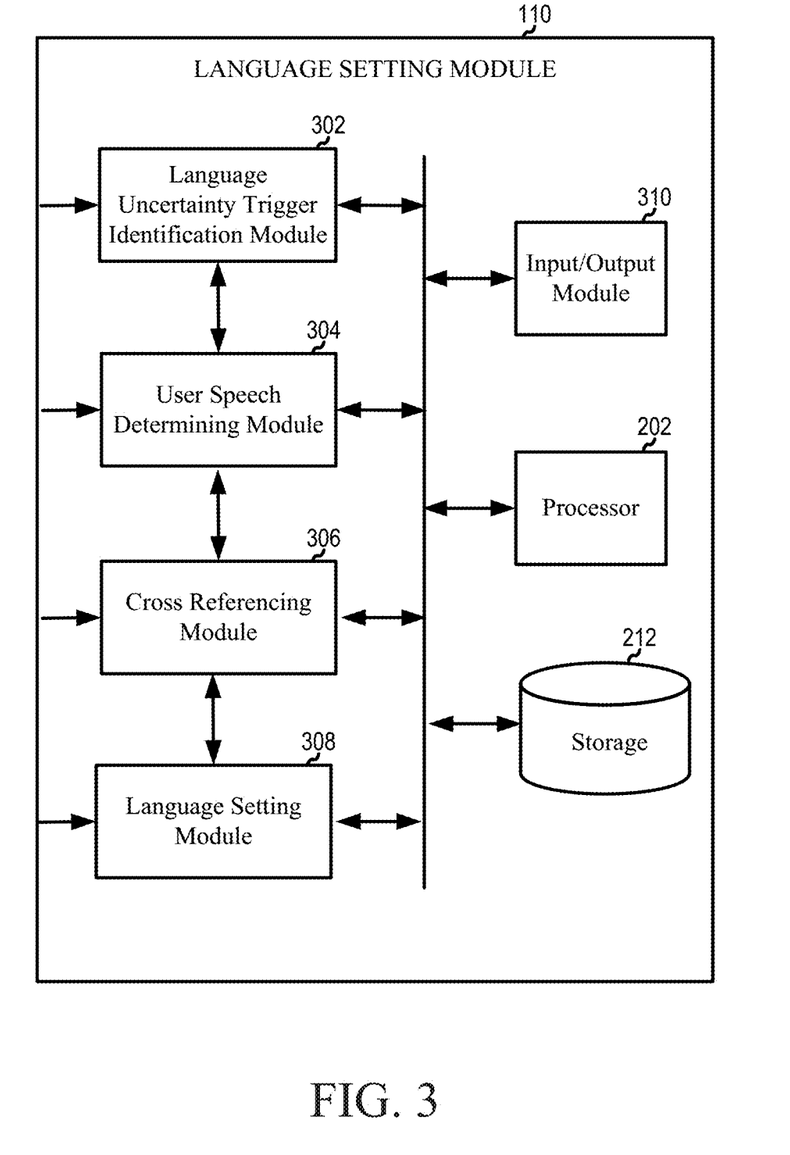
FIG. 3 is a block diagram conceptually illustrating a language setting module according to one aspect of the present disclosure.

FIG. 3 is a block diagram illustrating logical components of a language setting module 110 for setting a preferred language on a computing device. As noted, setting the preferred language may be based on communications from a user associated with the preferred language and/or cross referencing other information associated with the user or the computing device to determine and/or confirm the preferred language. As illustrated in FIG. 3, the language setting module 110 includes a language uncertainty trigger identification module 302, a user speech determining module 304, a cross referencing module 306, a language selecting module 308, and an input/output module 310. Further, for illustrative purposes, the language setting module 110 also includes the processor 202 and storage database 212, although the language setting module 110 may share such components (or other components) with the device 200.

The language uncertainty trigger identification module 302 may be configured to identify a language uncertainty trigger, which initiates the preferred language setting implementation. The language uncertainty trigger is an indication that the device may be operating in a language that is not understood (or desired) by the user. The language uncertainty trigger may take a number of forms. In one aspect the language uncertainty trigger may be when the device the user is speaking in a language other than the preferred language setting of the device (or of an application running on the device). The language uncertainty trigger may also be evidence of frustration in the speech of the user, such as the user expressing verbal displeasure with the device operation. In one aspect, the language uncertainty trigger may be an input of commands to a device that are illogical or indicate that a user does not understand the commands that he/she is inputting. A number of other potential triggers are also possible. In one aspect, the user speaking in a language different from the operating language of the device may be sufficient for to institute a change of the operating language.

The computing device may be configured to listen to speech from the user or monitor operation of the device to detect various language uncertainty triggers. In one aspect, the input/output module 310 may include a listening feature to listen for communication of the user. The device may be configured to detect for language uncertainty triggers at all times, such as in a passive mode, or during certain prescribed or predetermined windows. The device may also be configured for heightened sensitivity for language uncertainty triggers during prescribed windows. For example, in one aspect, the listening feature may be activated (or have its sensitivity increased) after a preferred language setting is changed on the computing device. For example, the listening feature may be activated when a user changes a language configuration or setting of the computing device to determine if such a change was accidental or intentional. For example, following a language change setting the computing device may listen to the user to identify any inquiries or indications of confusion/frustration from the user. For example, a user may inquire about getting back to a previous preferred setting, or to resetting the computing device to a preferred language, or the user may generally attempt to communicate with the device in a language other than the current preferred language setting. The listening period may also be activated during device reset, initialization, or during other windows.

The user speech determining module 304 may determine a language being spoken by a user at a time a language uncertainty trigger is identified. If a user is expressing dissatisfaction with the language operation of a device, the device may determine the language being spoken by the user and consider that language when determining a new language to set the device to. In one aspect, the language setting module 308 may simply set the new language of the device to the language being spoken by the user. In another aspect, the device may prompt the user for further confirmation, such as a verbal response, prior to reconfiguring a language setting of the computing device. The user may also be prompted to select a further configuration based on the identification of the language uncertainty trigger. For example, a user struggling to set a preferred language may be prompted to select the preferred language and/or other settings/configurations of the computing device, such as language changing permissions.

In another aspect, a choice of language may be cross referenced by the cross referencing module 306 against other information associated with the user or the computing device. Such other information may include previous settings/configurations of the device or content associated with the user and/or the computing device. For example, other information may include media stored on the computing device (or stored elsewhere but associated with the user and/or device) such as electronic books, music, videos, movies, contacts and/or other content. Other information may also include other settings/configurations such as language settings of other applications. For example, the computing device may base a preferred language setting of the device on whether the user explicitly set the language for some applications or software associated with the computing device. Based at least in part on these settings, the language setting module 308 may determine the preferred language or suggest one or more languages to the user when the device determines the user may be unfamiliar with a presently set language of the device or application.

The computing device may have communication capabilities including short message service (SMS), emails and the like. A language setting associated with these communications capabilities may provide an indication of the preferred language of the user with respect to the computing device. An explicitly set language and/or language associated with one or more communication capabilities of the computing device may assist the determination of a user preferred language for the computing device. In some aspects, the current language setting and/or the language associated with one or more communication capabilities may be used in conjunction with communications from the user in determining and/or selecting the preferred language.

In one aspect of the disclosure, setting the preferred language of the computing device may be based on settings/configuration associated with other computing devices currently or previously associated with the user. For example, a service provider, e.g., Amazon, may automatically apply language settings of a previously owned computing device, e.g., Kindle, to a current computing device owned by the user. The settings/configuration of current and previously owned computing devices may be stored in a remote memory associated with a remote device, such as a server. Each stored setting/configuration may be associated with a user such that the settings/configuration of a new device associated with the user may be set or configured based on one or more stored settings/configurations. In some aspects, the new device may be configured to prompt the user to confirm the settings/configurations of the new device. For example, the user may be prompted for feedback in the language associated with the new configuration/setting. The preferred language may be set for the computing device when the user responds with a confirmation. Otherwise the new device may execute a language preference initiation sequence as described below.

In addition to processing a user's speech to correct a language setting after identification of a language uncertainty trigger, the user's speech may be processed to identify a preferred language without prompting by the user in the form of the trigger. That is, the user may be prompted by the device to speak to the computing device upon an initial power up. The initial user communications received by the input/output module 310 during set up may serve as a training set with which the preferred language of the user is identified. Alternatively, the computing device may be configured with a communication trigger or button, by which the user may initiate a communication with the computing device for the purpose of preferred language setting. The communication trigger or button may be engaged by the user independent of the identification of the language uncertainty trigger. In this case, engaging the communication trigger may serve to activate a language setting process similar to the process activated by identification of the language uncertainty trigger.

In one aspect, identification of the communication trigger or language uncertainty trigger may initiate contact between a user and a customer service agent either through the device or through other means (such as a telephone call to another device.) The device may be configured so that a remote agent may reset a preferred language remotely by sending a command to the device to select a certain preferred language.

Figure 4:
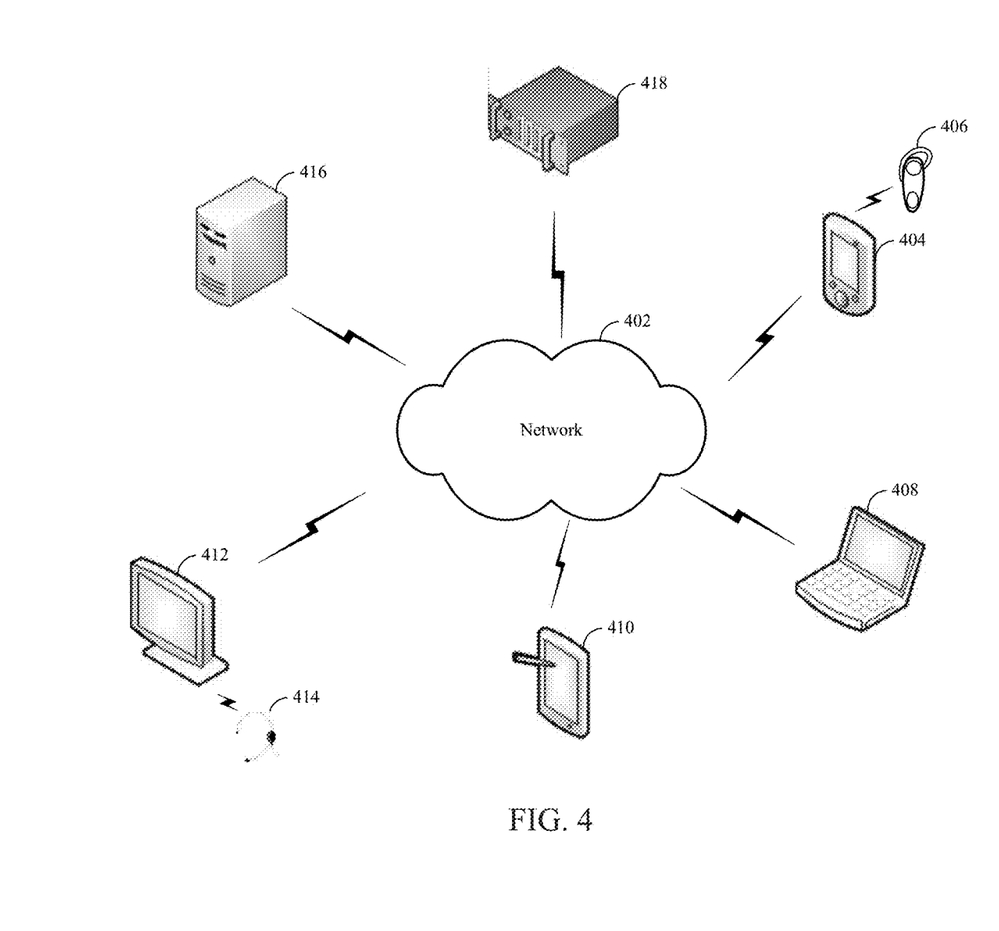
FIG. 4 illustrates a computer network for use with language identification processing according to one aspect of the present disclosure.

Multiple devices may be connected over a network and may coordinate in language selection. As shown in FIG. 4, multiple devices may be connected over network 402. Network 402 may include a local or private network or may include a wide network such as the internet. Devices may be connected to the network 402 through either wired or wireless connections. For example, a wireless device 404 may be connected to the network 402 through a wireless service provider. Other devices, such as computer 412, may connect to the network 402 through a wired connection. Other devices, such as laptop 408 or tablet computer 410 may be capable of connection to the network 402 using various connection methods including through a wireless service provider, over a WiFi connection, or the like. Networked devices may output synthesized speech through a number of audio output devices including through headsets 406 or 414. Audio output devices may be connected to networked devices either through a wired or wireless connection. Networked devices may also include embedded audio output devices, such as an internal speaker in laptop 408, wireless device 404 or table computer 410.

In certain language selection system configurations, a combination of devices may be used. For example, one device may receive a speech input from a user, another device may process that speech to determine the language of the speech, and still another device may output an indication of preferred language to a user's device. For example, a user's speech input may be received by a wireless device 404 and sent to a computer 414 or server 416 for language identification. The resulting language identification may be returned to the wireless device 404. Or computer 412 may partially process the speech before sending it over the network 402. Because such processing may involve significant computational resources, in terms of both storage and processing power, such split configurations may be employed where the device receiving the speech may have lower processing capabilities than a remote device and more rapid or higher quality results are desired. The processing may thus occur remotely from the device whose language settings are to be configured.

Accordingly, the computing device may utilize a speech/language recognition technique implemented at the computing device and/or remotely. For example, the computing device may include a speech recognition device to identify the language in which the user is speaking. Alternatively, the communication of the user may be deciphered at a remote device. The remote device may be a server hosting a speech recognition device. In this case, the user's speech may be forwarded from the local device to a remote device where the language is deciphered. The remote device may then indicate the spoken language to the local device for purposes of determining a language setting on the local device. Alternatively, the remote device may perform the language setting procedure and simply notify the local device of the determined preferred language.

In some aspects of the disclosure, identifying the language may be performed independent of understanding the language. For example, the language may be identified based on phoneme (sound of a language) recognition techniques, text recognition techniques or other language identification techniques that may be implemented on the computing device (e.g., speech recognition device). The phoneme recognition technique may be based on sounds associated with different languages. For example, a language may be identified by different sounds that follow each other in certain sequences. In some aspects, the speech/language recognition technique may apply a broad set of phonemes across different languages. The speech/language recognition technique may be based on models built for each language. In some aspects, the models may be customized to a particular user. For example, the models may be based on sound and text from a particular language as well as communications from the particular user. Models for identifying a language may be significantly simpler than models used for full speech recognition. Language identification models may be stored either on a local device or a remote device. When the computing device identifies one or more languages having similar sounding words the computing device may prompt the user to select a preferred language from the one or more identified languages.

To avoid toggling between two or more languages, the computing device may be configured to deactivate the preferred language setting implementation on the computing device. For example, if the language is explicitly set to English, and the user is detected conversing with a friend in French, the user may not want the computing device to reset the preferred language or to prompt the user to select a preferred language based on the French conversation. In this case, the preferred language setting implementation may be deactivated. In some aspects, the computing device may automatically prompt the user to activate or deactivate the computing device to avoid toggling between two or more languages.

When selecting a preferred language, the device may perform an audible check of the language selection with the user. For example, the device may output audio such as "I hear you speaking English. Is English your preferred language?" The device may process a verbal response from the user using language recognition techniques or speech recognition techniques to confirm the language choice. The device may also perform audible checks in other circumstances, such as when a user's spoken language may differ with a language detected in other content/configurations. For example, the device may output audio such as "I hear you speaking English, however your emails are in French. Would you prefer your device be set to English or French?"

In another aspect, the device may be configured to divide language preference settings, such as displaying all text in a first language but engaging in speech communications with a user in a second language.

In one aspect of the disclosure, setting the preferred language of the computing device may be based at least in part on the location of the computing device. The location of the computing device may be identified based on global position systems (GPS) or any other computing device location system. For example, a preferred language of a computing device may be set to English, when the GPS coordinates indicate that the computing device is in North Dakota. In some aspects of the disclosure, the user may be prompted to select between two or more languages corresponding to the location of the computing device. For example, when the GPS coordinates identify a multilingual region/state/country the user may be prompted to select between the languages associated with the multilingual region/state/country.

Figure 5:
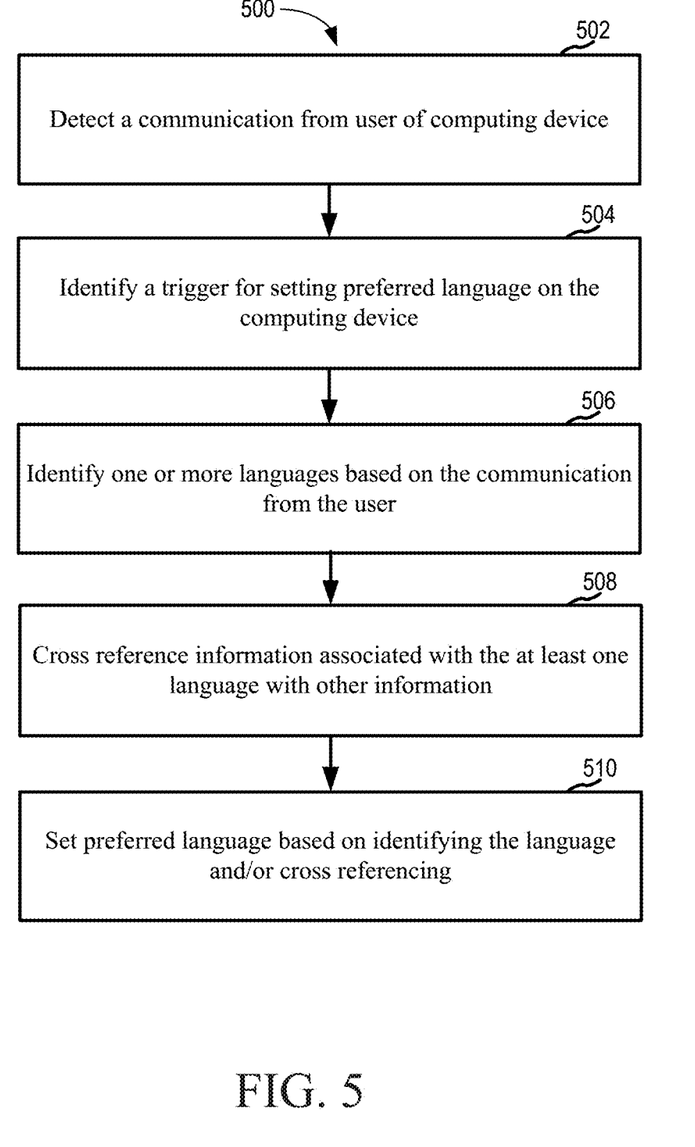
FIG. 5 illustrates a flow diagram of a method and system for setting a preferred language on a computing device according to one aspect of the present disclosure.

FIG. 5 illustrates a flow diagram 500 of a method for setting a preferred language according to one aspect of the present disclosure. The method may be implemented at a computing device (e.g., computing device 200) associated with a user device (e.g., wireless device 404/tablet computer 410). In some aspects of the disclosure, the computing device may be incorporated in the user device or incorporated in a remote device (e.g., a server over a network) that is coupled to the user device. In other aspects of the disclosure, the computing device may be partially incorporated in the user device and/or the remote device. At block 502, the computing device may detect a communication of a user of the computing device. At block 504, the computing device may identify a trigger for setting a preferred language on a computing device. The trigger may be the communication trigger, language uncertainty trigger, or other trigger. The trigger may be identified from the user's communication at block 502. At block 506, the computing device may identify one or more languages based on the communication of the user. At block 508, the computing device may cross reference information associated with the at least one language with other information associated with the user and/or the computing device. At block 510, the computing device may set the preferred language based on the identifying of the language and/or the cross referencing.

Figure 6:
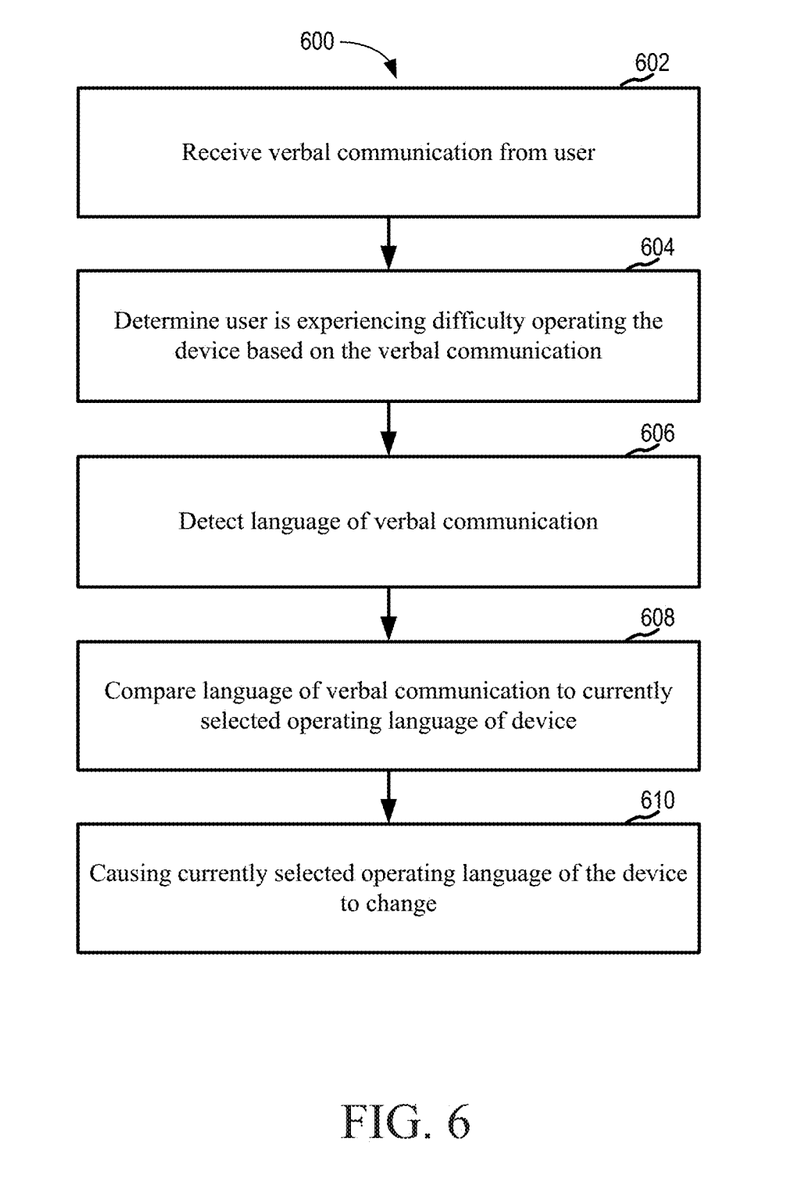
FIG. 6 illustrates a flow diagram of a method and system for setting a preferred language on a computing device according to one aspect of the present disclosure.

FIG. 6 illustrates a flow diagram 600 of a method for setting a preferred language according to one aspect of the present disclosure. The method may be implemented at a computing device (e.g., computing device 200) associated with a user device (e.g., wireless device 404/tablet computer 410). In some aspects of the disclosure, the computing device may be incorporated in the user device or incorporated in a remote device (e.g., a server over a network) that is coupled to the user device. In other aspects of the disclosure, the computing device may be partially incorporated in the user device and/or the remote device. At block 602, the computing device may receive a verbal communication of a user. At block 604, the computing device may determine that the user is experiencing difficulty operating the device based at least in part on the verbal communication. At block 606, the computing device may detect a language of the verbal communication of the user of the computing device. At block 608, the computing device may compare the language of the verbal communication to a currently selected operating language of the device. At block 610, the computing device may cause the currently selected operating language of the device to be changed based at least in part on determining that the language of the verbal communication is different from the currently selected operating language of the device.

Although aspects of the present disclosure describes setting a preferred language of the computing device, the present disclosure is not so limited. In some aspects, other setting and/or configurations of the computing device may be set or activated using a communication of the user. For example, speech from the user may be processed in conjunction with the speech recognition/language technique to initially set up features of the computing device, such as naming the computing device and setting up wireless local area network. Other applications of the present teachings are also possible.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the detection techniques described herein may be applied to many different languages. Persons having ordinary skill in the field of computers, digital imaging, and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A method for setting a preferred language on a computing device, the method comprising:
   operating the computing device using a language setting associated with a first language, the first language being a currently selected operating language;
   receiving an audio communication of a user;
   detecting at least one second language of the audio communication, the at least one second language being different from the first language;
   identifying stored data associated with the computing device or the user, the stored data corresponding to at least one of an electronic book, music, video, or a movie;
   determining the data corresponds to the at least one second language; and
   causing the currently selected operating language to be changed to the at least one second language based on the detecting the at least one second language of the audio communication and the determining that the data corresponds to the at least one second language.

2. A computing device, comprising:
   at least one processor; and
   a memory device including instructions which, when executed by the at least one processor, cause the computing device to:
   operate the computing device using a language setting associated with a currently selected operating language;
   receive an audio input including speech from a user;
   determine that a language of the speech is different from the currently selected operating language of the computing device;
   identify stored data associated with the user, the data corresponding to at least one of an electronic book, music, video, or a movie;
   determine that the data corresponds to at least one second language different from the current operating language of the computing device; and
   cause the current operating language of the computing device to change based on a detected at least one language of the speech and the at least one second language.

3. The computing device of claim 2, wherein the memory device includes additional instructions which, when executed by the at least one processor, further cause the computing device to:
   cause the current operating language to change to the detected at least one language of the speech.

4. The computing device of claim 2, wherein the memory device includes additional instructions which, when executed by the at least one, further cause the computing device to:
   prompt the user to select a first language from at least the detected at least one language of the speech and the at least one second language; and
   cause the current operating language to change to the first language.

5. The computing device of claim 2, wherein the memory device includes additional instructions which, when executed by the at least one processor, further cause the computing device to:
   prompt the user for verbal confirmation prior to causing the current operating language to be changed.

6. A non-transitory computer-readable medium encoded with instructions which, when executed by at least one processor of a computing device, cause the computing device to:
   operate using a language setting associated with a currently selected operating language;
   receive user input comprising an audio communication;
   identify stored data associated with the user, the data corresponding to at least one of an electronic book, music, video, or a movie;
   determine that the data corresponds to at least one second language different from the currently selected operating language of the computing device; and
   cause the currently selected operating language of the computing device to change based on a detected at least one language of the speech and the at least one second language.

7. The non-transitory computer-readable medium of claim 6, encoded with additional instructions which, when executed by the at least one processor, further cause the computing device to;
   cause the currently selected operating language to change to the detected at least one language of the speech.

8. The non-transitory computer-readable medium of claim 6, encoded with additional instructions which, when executed by the at least one processor, further cause the computing device to:
   prompt the user to select a first language from at least the detected at least one language of the speech and the at least one second language; and
   cause the currently selected operating language to change to the first language.

9. The non-transitory computer-readable storage medium of claim 6, encoded with additional instructions which, when executed by the at least one processor, further cause the computing device to:
  prompt the user for verbal confirmation prior to causing the currently selected operating language to be changed.

10. The non-transitory computer-readable storage medium of claim 6, wherein the instructions which, when executed by the at least one processor, cause the computing device to identify the stored data and determine that the data corresponds to the at least one second language are executed in response to a device activation.

11. The non-transitory computer-readable storage medium of claim 6, wherein the instructions which, when executed by the at least one processor, cause the computing device to identify the stored data and determine that the data corresponds to the at least one second language are executed during predetermined intervals.

12. The method claim 1, further comprising:
  prompting the user for verbal confirmation prior to causing the currently selected operating language to be changed to the at least one second language.

13. The method of claim 1, wherein:
  the method further comprises determining that the language setting of the device has been changed; and
  the detecting the at least one second language, the identifying the stored data, and the determining that the data corresponds to the at least one second language are performed in response to a determination that the language setting of the device has been changed.

14. The method of claim 1, wherein:
  the method further comprises determining that a reset of the device has occurred; and
  the detecting the at least one second language, the identifying the stored data, and the determining that the data corresponds to the at least one second language are performed in response to a determination that the reset of the device has occurred.

15. The method of claim 1, wherein:
  the method further comprises determining, based at least in part on an indication included in the speech, that the user is experiencing difficulty operating the device using the currently selected operating language; and
  the detecting the at least one second language, the identifying the stored data, and the determining that the data corresponds to the at least one second language are performed in response to determining that the user is experiencing difficulty operating the device using the currently selected operating language.

16. The computing device of claim 2, wherein:
  the memory device includes additional instructions which, when executed by the at least one processor, further cause the computing device to determine that the language setting of the device has been changed; and
  the instructions which, when executed by the at least one processor, cause the computing device to determine that the language of the speech is different from the currently selected operating language, identify the stored data, and determine that the data corresponds to the at least one second language are encoded to be executed are executed in response to a determination that the language setting of the device has been changed.

17. The computing device of claim 2, wherein:
  the memory device includes additional instructions which, when executed by the at least one processor, further cause the computing device to determine that a reset of the device has occurred; and
  the instructions which, when executed by the at least one processor, cause the computing device to determine that the language of the speech is different from the currently selected operating language, identify the stored data, and determine that the data corresponds to the at least one second language are encoded to be executed are executed in response to a determination that the reset of the device has occurred.

18. The computing device of claim 2, wherein:
  the memory device includes additional instructions which, when executed by the at least one processor, further cause the computing device to determine, based at least in part on an indication included in the speech, that the user is experiencing difficulty operating the device using the currently selected operating language; and
  the instructions which, when executed by the at least one processor, cause the computing device to determine that the language of the speech is different from the currently selected operating language, identify the stored data, and determine that the data corresponds to the at least one second language are encoded to be executed are executed in response to a determination that the user is experiencing difficulty operating the device using the currently selected operating language.

19. The non-transitory computer-readable storage medium of claim 6, wherein:
  the computer-readable storage medium is encoded with additional instructions which, when executed by the at least one processor, further cause the computing device to determine that the language setting of the device has been changed; and
  the instructions which, when executed by the at least one processor, cause the computing device to identify the stored data and determine that the data corresponds to the at least one second language are encoded to be executed in response to a determination that the language setting of the device has been changed.

20. The non-transitory computer-readable storage medium of claim 6, wherein:
  the computer-readable storage medium is encoded with additional instructions which, when executed by the at least one processor, further cause the computing device to determine that a reset of the device has occurred; and
  the instructions which, when executed by the at least one processor, cause the computing device to identify the stored data and determine that the data corresponds to the at least one second language are encoded to be executed in response to a determination that the reset of the device has occurred.

21. The non-transitory computer-readable storage medium of claim 6, wherein:
  the computer-readable storage medium is encoded with additional instructions which, when executed by the at least one processor, further cause the computing device to determine, based at least in part on an indication included in the speech, that the user is experiencing difficulty operating the device using the currently selected operating language; and the instructions which, when executed by the at least one processor, cause the computing device to identify the stored data and determine that the data corresponds to the at least one second language are encoded to be executed in response to a determination that the user is experiencing difficulty operating the device using the currently selected operating language.

\* \* \* \* \*